US007284199B2

(12) United States Patent
Parasnis et al.

(10) Patent No.: US 7,284,199 B2
(45) Date of Patent: Oct. 16, 2007

(54) PROCESS OF LOCALIZING OBJECTS IN MARKUP LANGUAGE DOCUMENTS

(75) Inventors: Shashank Mohan Parasnis, Palo Alto, CA (US); David Kesterson, Cupertino, CA (US); Paul C. Poon, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 452 days.

(21) Appl. No.: 09/746,698

(22) Filed: Dec. 21, 2000

(65) Prior Publication Data

US 2001/0044809 A1 Nov. 22, 2001

Related U.S. Application Data

(60) Provisional application No. 60/193,406, filed on Mar. 29, 2000.

(51) Int. Cl.
*G06F 17/00* (2006.01)
(52) U.S. Cl. ......................... 715/535; 715/513
(58) Field of Classification Search ............... 715/536, 715/513, 703; 345/703
See application file for complete search history.

(56) References Cited

U.S. PATENT DOCUMENTS

| | | | | |
|---|---|---|---|---|
| 6,490,547 | B1 * | 12/2002 | Atkin et al. | 704/8 |
| 6,623,529 | B1 * | 9/2003 | Lakritz | 715/536 |
| 7,191,393 | B1 * | 3/2007 | Chin et al. | 715/513 |

OTHER PUBLICATIONS

"Basics of Server-Side JavaScript", http://web.archive.org/web/20011115075051/http://oradb1.jinr.ru/netscape/wssja/jsserv.htm © 1997 Netscape.*
Bos et al., "Cascading Style Sheets, level 2, CSS2 Specification, W3C Recommendation", May 12, 1998, Chapter 2, http://www.w3.org/TR/REC-CSS2/cover.html.*

* cited by examiner

*Primary Examiner*—Stephen Hong
*Assistant Examiner*—Adam M. Queler

(57) ABSTRACT

A method and system that facilitates localization of objects in markup language documents so that a single set of markup language documents (the set including one or more documents) provide support for displaying portions of the documents in a language selected from among a plurality of different languages. Localized objects are included within in markup language documents through the use of placeholder variables in the documents. The placeholder variables are linked to localized objects through a reference file having entries populated with localized objects that are extracted from a dynamic link library based on a language selected by a user. Before loading each markup language document into a browser, the placeholder variables are replaced with their associated localized objects during a pre-rendering operation. When the markup language documents are rendered by the browser, display pages are produced containing localized objects in the language selected by the user. The present invention also provides for localizing composite graphic objects, which include a global portion, such as a trademark logo, and a localized portion, such as a phrase, through the use of cascading style sheets, thereby enabling the phrase to be rendered in a specified language.

22 Claims, 6 Drawing Sheets

PROCESS OF LOCALIZING OBJECTS IN MARKUP LANGUAGE DOCUMENTS

RELATED APPLICATIONS

This application is based on a prior copending provisional application, Ser. No. 60/193,406 filed on Mar. 29, 2000, the benefit of the filing date of which is hereby claimed under 35 U.S.C. § 119(e).

FIELD OF THE INVENTION

The present invention generally concerns a method for providing support for different languages in a software application program, and in particular, concerns a method for localizing elements and objects in web pages so that the web pages are properly rendered to convey a desired content in accord with a specified language.

BACKGROUND OF THE INVENTION

Many of today's software application programs are distributed in different versions that support various different languages. For example, Microsoft Corporation's WORD™ word processing application program is used throughout the world, and is distributed in versions that support one of a myriad of different languages, including European languages, Baltic languages, Arabic languages, Cyrillic languages, and Asian languages, as well as various dialects.

In order to enable a software application to be usable by those who understand different languages, it is necessary to provide localized support for each such language. As used herein, the term "localize" means to provide a language-specific object, such as an element in a document or portion thereof, a graphic, a resource, etc., that can be locally accessed by the application program. Thus, the object will often be stored on a local hard drive of a user's computer. For example, a set of localized objects are typically installed on a user's computer during installation of an application program and correspond to a language selected by the user during the installation process.

The simplest way to localize objects is to provide a language-specific version of each object. However, this approach consumes a great deal of storage on the media used for distribution of applications and is undesirable from a manufacturing standpoint when many objects need to be localized, for many different languages. For this reason, software companies generally prefer to produce as few versions of each application program as possible, such as a U.S. version and an International version. However, if the International version is designed to support ten different languages (other than U.S. English), and a separate set of localized objects must be provided for each language, the storage requirement on the distribution media for the localized objects in the International version will be approximately ten times as much as that required for the objects in the U.S. version.

An important aspect of most application programs is the user interface (UI). It is through the user interfaces that various features provided by a program are selectively accessed, typically through a set of pull-down menus and dialog boxes. In order to provide support for a particular language, the options displayed in the pull-down menus and dialog boxes must be presented in that language. Traditionally, the solution to this problem has been to provide code for a different version of the UI, for each supported language.

Rather than provide a set of separate localized resources, such as a UI for each language, it is preferable to enable localization of an application for different languages in a way that reduces unnecessary duplication of significant portions of those resources. Such a scheme is provided by the Microsoft Office International Interface, which enables an application program's developers to code a single set of menus and dialog boxes that reference localized strings containing language-specific data (e.g., text). For instance, if a user selects Russian as the UI language, the set of pull-down menus and dialog boxes for the program will include various options labeled in Russian, while if the user selects Japanese to be the UI language, the same options will be labeled in Japanese.

Recently, there has been a substantial increase in application program features that enable users to access network resources, such as various data and applications available on the Internet. In order to facilitate these added features, the UI's in these applications typically include hypertext markup language (HTML) pages. The use of such HTML pages in the UI presents a similar problem with respect to supporting different languages, i.e., a separate set of HTML pages generally has to be supplied for the UI in each language that is supported by an application. Optionally, localization of the HTML pages for the UI may be provided through use of a plurality of Active Server pages that access language-specific strings stored in a database. Neither of these options is an ideal solution to the problem. The first option requires a large amount of storage space on distribution media, often forcing software producers to limit the extent of language localization provided for their applications, and the second option requires the use of extra resources, such as Active Server support files, to be supplied by the software producer and installed on a user's computer (if not already installed). Furthermore, the Microsoft Office International Interface does not provide an optimal solution for localizing HTML pages. Accordingly, it would be desirable to provide a method for localizing HTML pages so as to minimize storage requirements and avoid the use of Active Server pages.

SUMMARY OF THE INVENTION

In accord with the present invention, a method and system are provided to facilitate localization of objects in markup language documents so that a single set of markup language documents (or a single document, if applicable) can be used to support a plurality of different languages. This invention enables developers to include localized objects in markup language documents by using placeholder variables in the documents. The placeholder variables are linked to localized objects through a reference file having entries populated with localized objects that are extracted from a dynamic link library (dll) file based on a language selected by a user. When a markup language document is opened in a browser, the placeholder variables are replaced with their associated localized objects during a pre-rendering operation. Accordingly, when the markup language documents are rendered by the browser, display pages are produced containing localized objects that convey content in the language selected by the user.

In the method, the markup language document is written to include a plurality of references corresponding to text, graphic, and/or media objects that are to be presented and which include content in the specified language that will be employed when the markup language document is rendered. A set of localized objects in the specified language is provided so that it can be locally accessed (e.g., the localized objects are stored on the hard disk of a user's computer). Each localized object is associated with a corresponding text, graphic, and/or media object referenced in the document through use of placeholder values in the document, and a reference file that includes a plurality of name-value pairs linking each placeholder value to a corresponding localized object. The localized objects are then inserted into the markup language document based on the plurality of name-value pairs, such that when the markup language document is rendered, the text, graphic, and/or media objects referenced in the markup language document are rendered in the specified language. Preferably, the localization is accomplished through execution of JavaScript code contained within the markup language document, which causes the placeholder values to be replaced with the corresponding localized object by parsing the reference file during a pre-rendering step.

Another aspect of the present invention is directed to a method that enables an application program to include a UI adapted to support a plurality of different languages through use of a single set of markup language documents, which are not specifically coded in each of the different languages. Sets of localized objects corresponding to each of the languages supported by the UI are stored in a dll file on a user's computer. Based on a user-specified language, placeholder references corresponding to various global objects in the markup language documents are replaced with localized objects through use of the dll file, the reference file, and JavaScript code contained in the markup language documents. Accordingly, the UI comprises a plurality of display pages each corresponding to a different one of the plurality of markup language documents. The display pages include objects that are rendered to convey content in the selected language.

According to another aspect of the invention, a method is defined to enable composite graphic objects to be included in markup language documents such that when the documents are rendered, the composite graphic includes global content (e.g., a trademark logo) and localized content in the specified language. Preferably, the localized content can be rendered to have stylistic attributes in accord with cascading style sheet declarations in the markup language document. In this manner, the composite graphic objects appear as a single localized object when they are rendered.

A still further aspect of the present invention is directed to a system that includes a memory in which data and machine instructions are stored, a display on which graphics and text are presented to a user, a processor that is coupled to the memory and executes the machine instructions, and a persistent storage device, coupled to the processor and the memory, on which one or more sets of localized objects are stored. When executed by the processor, the machine instructions cause the processor to implement functions that are generally consistent with the steps of the methods discussed above in connection with rendering the markup language documents. In addition, a computer-readable medium having computer-executable instructions for performing the these functions is another aspect of the present invention.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 5:
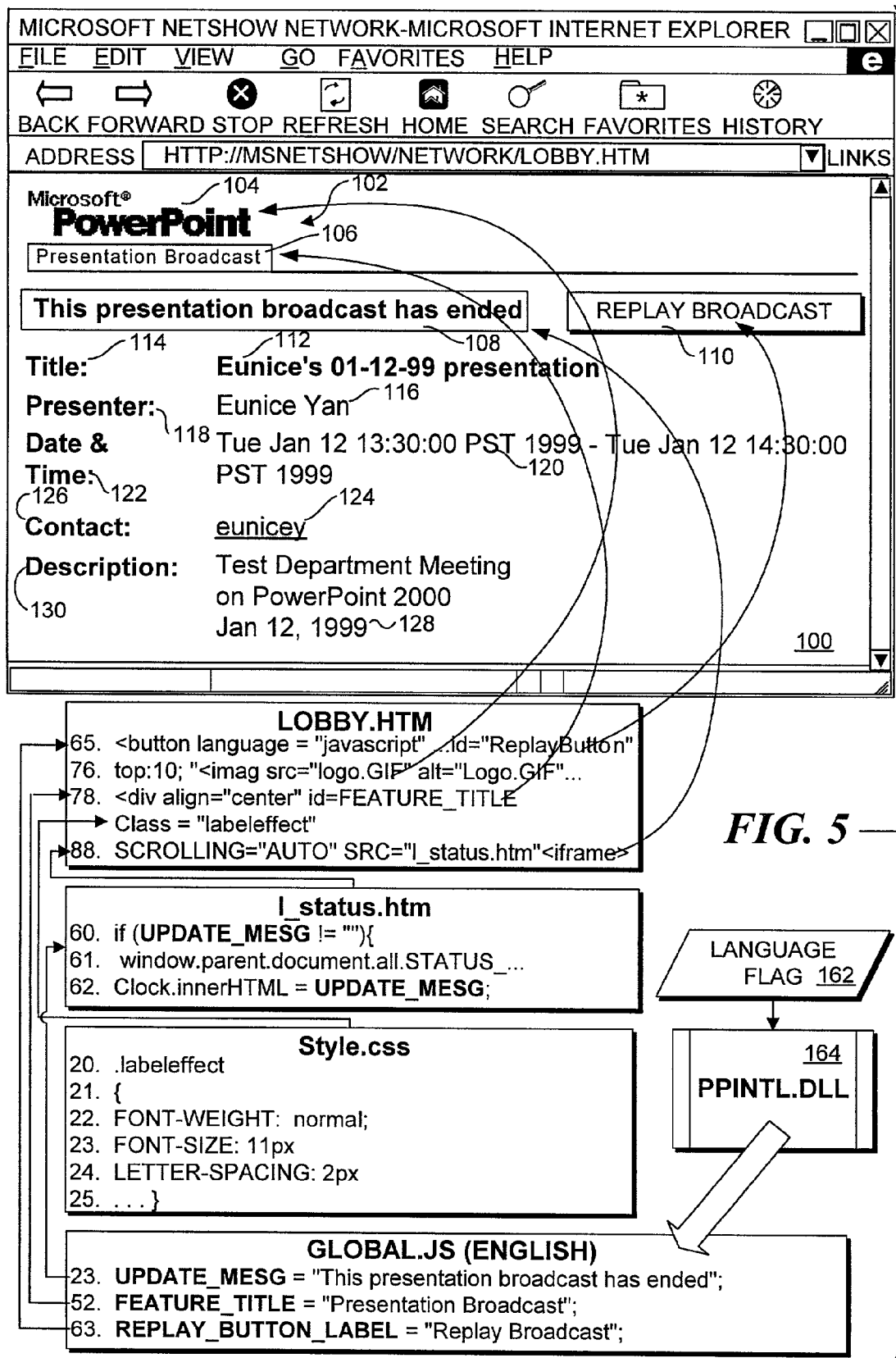
Figure 6:
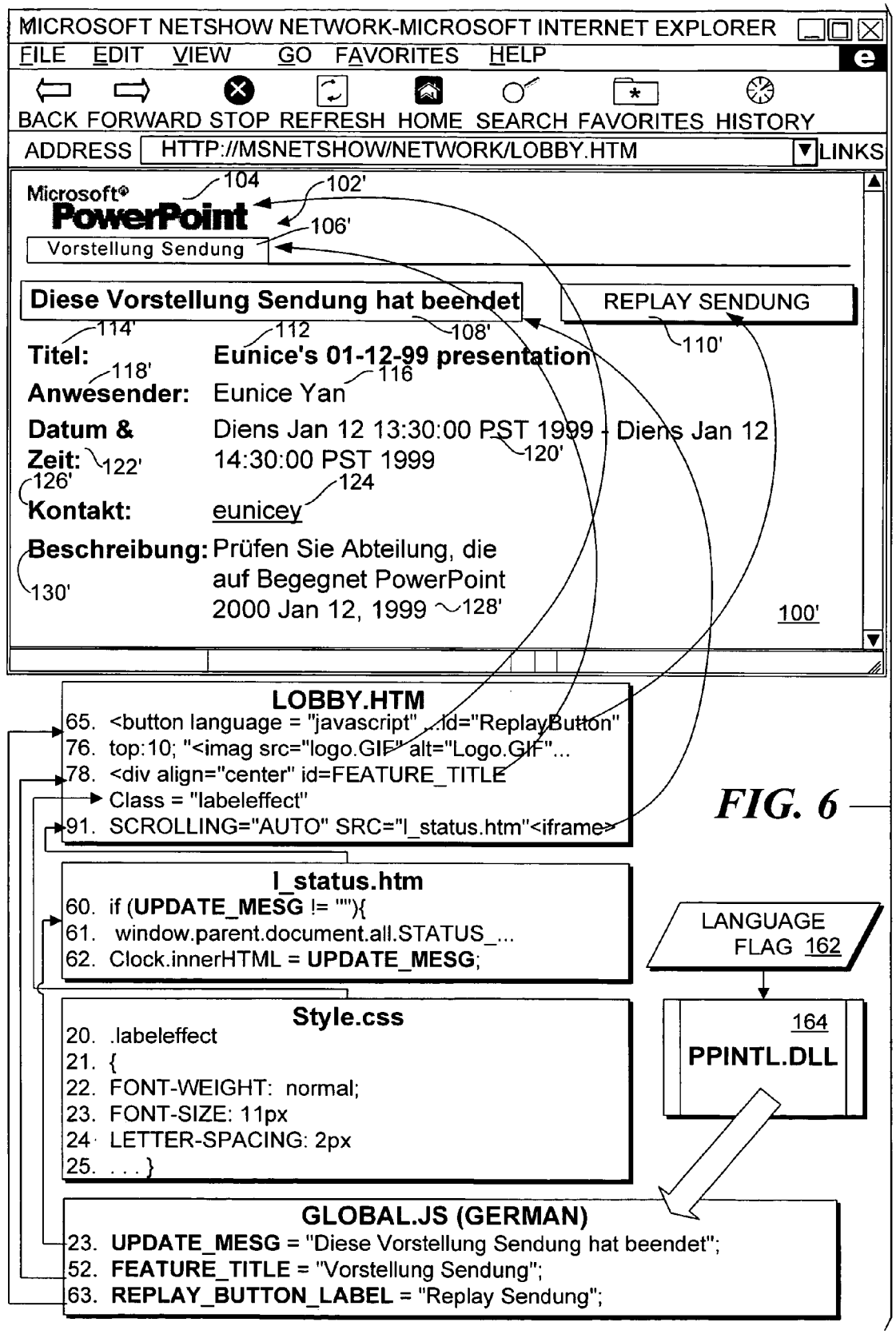

FIG. 5 is a schematic diagram illustrating how localized objects corresponding to a composite graphic object, status box, and button are rendered in an exemplary markup language document to produce an English language rendered page; and FIG. 6 is a schematic diagram illustrating how localized objects corresponding to a composite graphic object, status box, and button are inserted into a exemplary markup language document to produce a German language rendered page.

DESCRIPTION OF PREFERRED EMBODIMENTS

Exemplary Operating Environment

Figure 1:
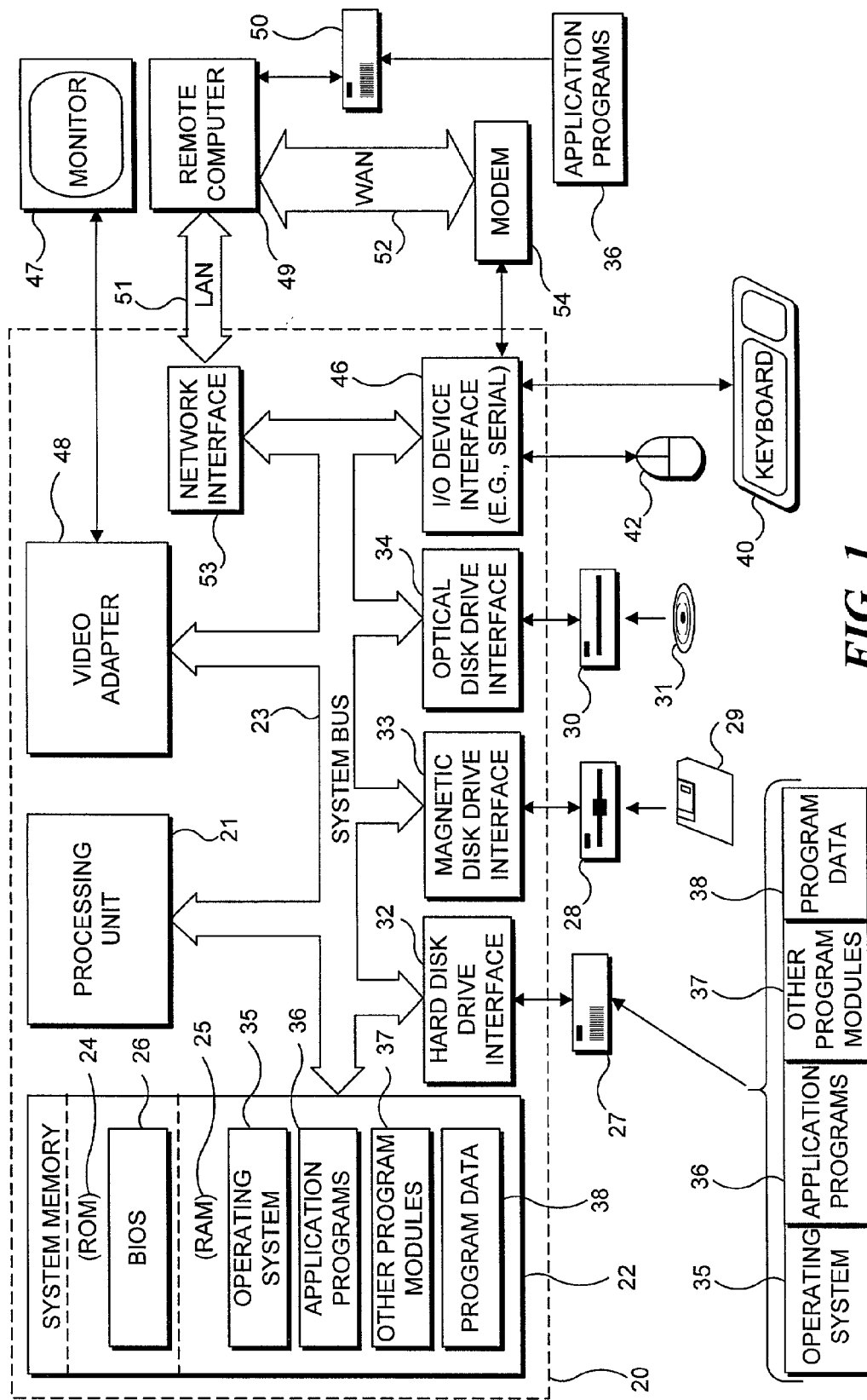
FIG. 1 is a schematic block diagram of an exemplary personal computer (PC) system suitable for implementing the present invention.

FIG. 1 and the following discussion are intended to provide a brief, general description of a suitable computing environment in which the present invention may be implemented. Although not required, the present invention will be described in the general context of computer-executable instructions, such as program modules, that are executed by a PC. Generally, program modules include routines, programs, objects, components, data structures, etc. that perform particular tasks or implement particular abstract data types. Moreover, those skilled in the art will appreciate that the present invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional PC 20, including a processing unit 21, a system memory 22, and a system bus 23 that couples various system components including the system memory to processing unit 21. System bus 23 may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that help to transfer information between elements within PC 20, such as during start-up, is stored in ROM 24. Personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM, or other optical media, such as DVDs. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer readable instructions, data structures, program modules, and other data for PC 20. Although the exemplary environment described herein employs a hard disk, a removable magnetic disk 29, and a removable optical disk 31, it should be appreciated by those skilled in the art that other types of computer readable media which can store data that is accessible by a computer, such as magnetic cassettes, flash memory cards, digital video disks, Bernoulli cartridges, RAM devices, ROM devices, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and pointing device 42. Other input devices (not shown) may include a microphone, joystick, game pad, satellite dish, scanner, and the like. These and other input devices are often connected to processing unit 21 through a serial port interface 46 that is coupled to the system bus, but may be connected by other interfaces, such as a parallel port, game port, or a universal serial bus (USB) port. A monitor 47 or other type of display device is also connected to system bus 23 via an interface, such as a video adapter 48. In addition to the monitor, other peripheral output devices, such as speakers and printers (not shown), can be connected to the PC.

PC 20 may operate in a networked environment using logical connections to one or more remote computers, such as a remote computer 49. Remote computer 49 may be another PC, a server, a router, a network PC, a peer device or other common network node, and typically includes many or all of the elements described above relative to PC 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the like. The PC will also typically be coupled to the Internet via a modem 54 or through a network connection or through a high speed interface device, such as cable modem (not shown).

When used in a LAN networking environment, PC 20 is connected to local network 51 through a network interface or adapter 53. When used in a WAN networking environment, PC 20 typically includes modem 54 or other means for establishing communications over WAN 52. Modem 54, which may be internal or external, is connected to system bus 23 via serial port interface 46. In a networked environment, program modules depicted relative to PC 20, or portions thereof, may be stored in the remote memory storage device. It will be appreciated that the network connections shown are exemplary and other means of establishing a communications link between the computers may be used.

Exemplary Presentation Broadcasting Implementation of the Present Invention

The following describes an exemplary implementation of the present invention corresponding to its use with presentation broadcasting aspects of Microsoft Corporation's POWERPOINT 2000™ application program. Further details of the presentation broadcasting aspects of POWERPOINT 2000™ are discussed in co-pending U.S. patent application, Ser. No. 09/333,754, entitled "PRESENTATION BROADCASTING SCHEDULING," filed Jun. 15,1999, the full and complete disclosure and drawings of which are hereby specifically incorporated herein by reference. Additionally, the following exemplary presentation broadcasting implementation is described in the context of its use with HTML documents, but this example is not meant to be limiting, as it will be understood by those skilled in the art that the concepts and method disclosed below are applicable to any type of markup-language-based documents, including HTML, standard generalized markup language (SGML), and extended markup language (XML) documents.

Generally, presentation broadcasting comprises an online broadcast of a live (or recorded) presentation over a computer network to a plurality of online "attendees" who are able to view the presentation at their own computers. This capability is enabled, in part, by broadcasting HTML content corresponding to the presentation to the online attendees' computers or workstations, and the HTML content is rendered in near real-time by an appropriate browser application program running on each of the attendee computers or workstations.

POWERPOINT 2000™ facilitates the creation and scheduling of broadcast presentations and provides a rich set of features for creating professional quality presentations. Typically, once a presentation is created, it is presented to a live audience by either the creator of the presentation, or another person. In the context of presentation broadcasting, the live presentation can be broadcast over a computer network, e.g., over an intranet or the Internet, to an online audience.

In order to receive the online broadcast, each attendee typically first connects to a "lobby" page. The lobby page provides information concerning the presentation broadcast, such as the presenter, title of the presentation, date and time, etc., as well as information concerning when the presentation will start, and its status. The lobby page further includes context-sensitive UI features that can enable online attendees to replay a completed broadcast, and ask questions of the presenter during a broadcast, if the presenter chooses to accept such questions.

Figure 2:
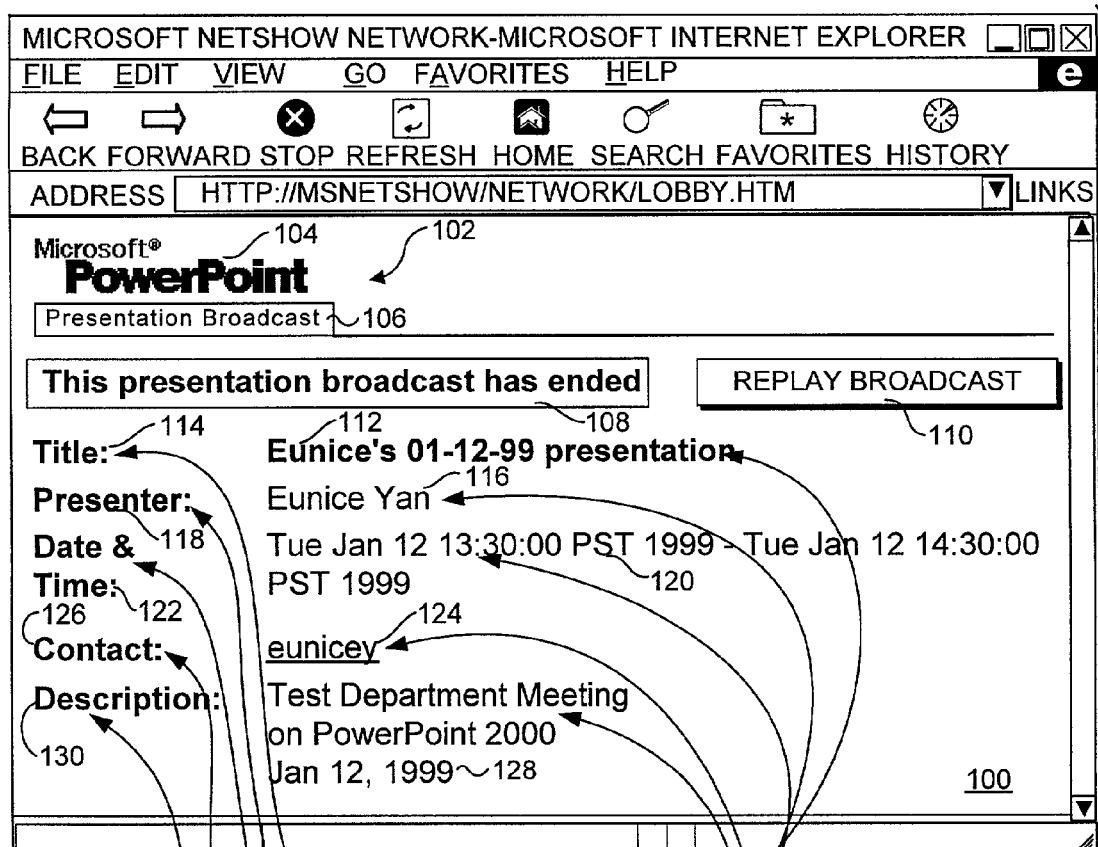
FIG. 2 is a schematic diagram illustrating how localized objects are rendered in an exemplary markup language document to produce an English language page in a browser, corresponding to a typical presentation broadcast.
Figure 2:
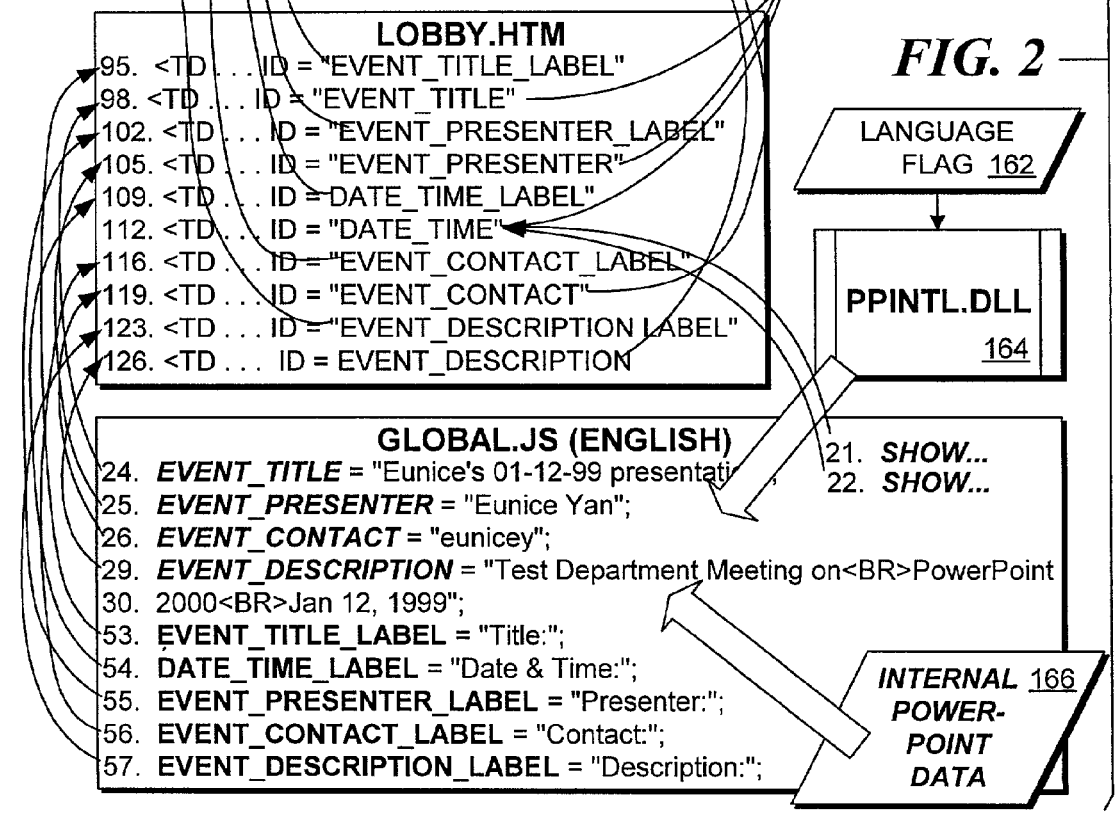

An exemplary English language lobby page 100, as rendered in an attendee's browser during a typical presentation broadcast, is shown in FIG. 2. In general, the lobby pages in FIGS. 2, 3, 5, and 6 represent the appearance of the lobby pages when rendered by Microsoft Corporation's INTERNET EXPLORER™ browser program. English lobby page 100 includes a composite graphic 102, comprising a trademark logo 104 and a banner 106, which is disposed in an upper portion of the lobby page. As described in further detail below, trademark logo 104 comprises a global portion of composite graphic 102, while banner 106 comprises a localized portion of the composite graphic. The upper portion of English lobby page 100 also includes a broadcast status box 108, and a replay broadcast button 110.

Information concerning the presentation broadcast is presented in a tabular format on the lower portion of English lobby page 100. This information includes a presentation title 112, which is displayed adjacent a "Title:" label 114, a presentation presenter name 116, which is displayed opposite a "Presenter:" label 118, and a date and time 120 at which the presentation is to be (or was) broadcast, which is displayed adjacent a "Date & Time:" label 122. In addition, a contact e-mail address 124 is provided adjacent a "Contact:" label 126, and a presentation description 128 is displayed adjacent a "Description:" label 130.

In the context of POWERPOINT 2000's presentation broadcasting features, English lobby page 100 comprises a portion of POWERPOINT 2000's that enables online attendees to view a presentation. Rather than employing a pulldown menu or a one or more dialog boxes, this UI is an HTML document that is rendered in the browser on each online attendees computer.

As discussed above, many application programs are published in different language versions. POWERPOINT 2000™ also provides support for different languages, but does so by using the present invention. Traditionally, in order to provide support for each of the different languages, a separate HTML UI document (or sets of HTML UI documents if multiple UI pages are required) would have to be written for each language. However, the present invention enables an HTML-based UI to support a plurality of different languages using just a single set of HTML documents (one for each page required).

Figure 3:
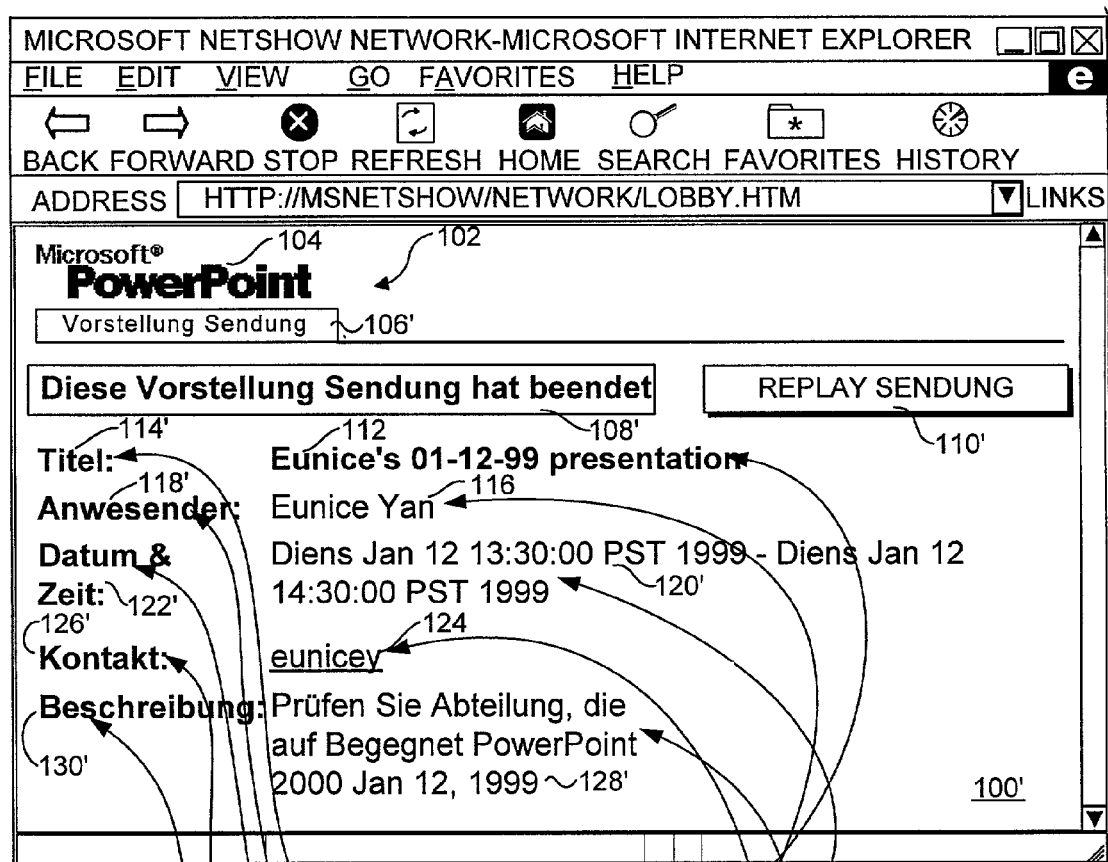
FIG. 3 is a schematic diagram illustrating how localized objects are rendered in the exemplary markup language document to produce a German language page that is analogous to the English language page of FIG. 2.
Figure 3:
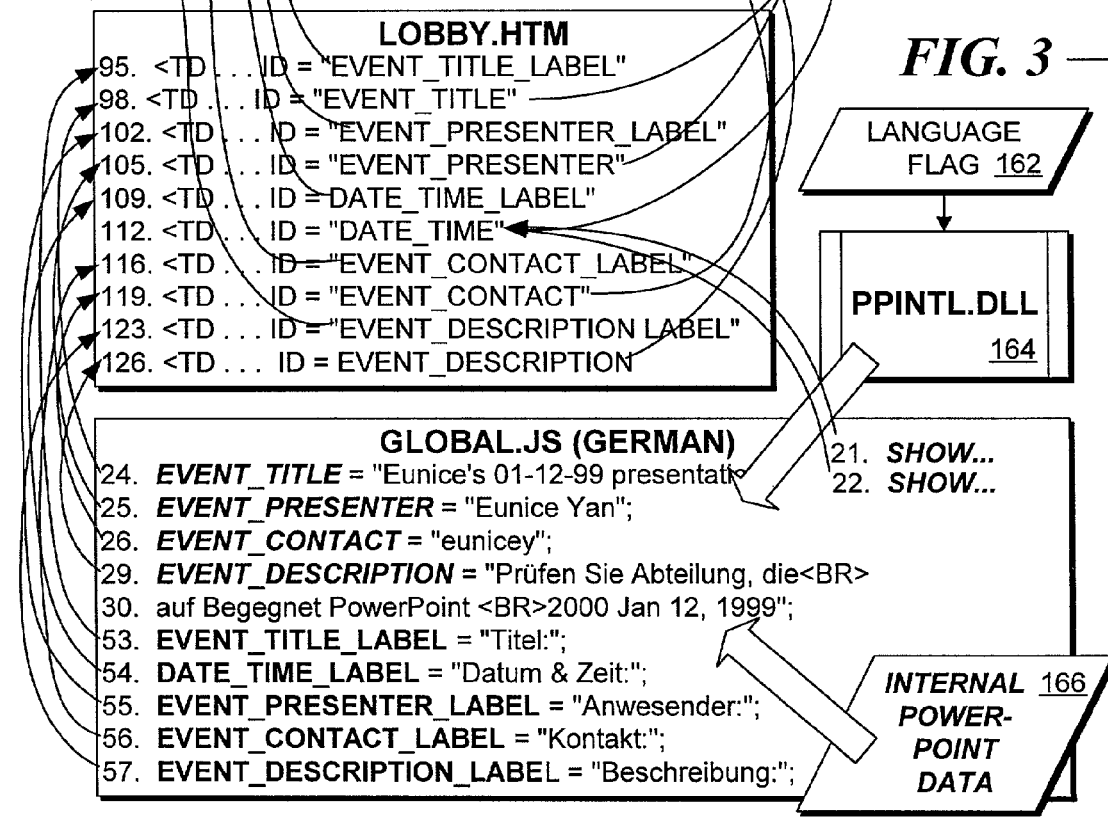

For example, English lobby page 100 can be rendered in one of several different languages. Suppose that a German company would like to perform a presentation broadcast. Accordingly, the labels and other information on the lobby page should be rendered in the German language. A German lobby page 100' corresponding to English lobby page 100 is shown in FIG. 3 and includes objects that have been rendered in German. Note that in these drawings, objects in FIG. 3 that correspond to similar objects in FIG. 2 are identified by adding a prime (') to the reference numeral that was used in FIG. 2. For example, "Title;" label 114 in FIG. 2 corresponds to a "Titel:" label 114' in FIG. 3.

Figure 4:
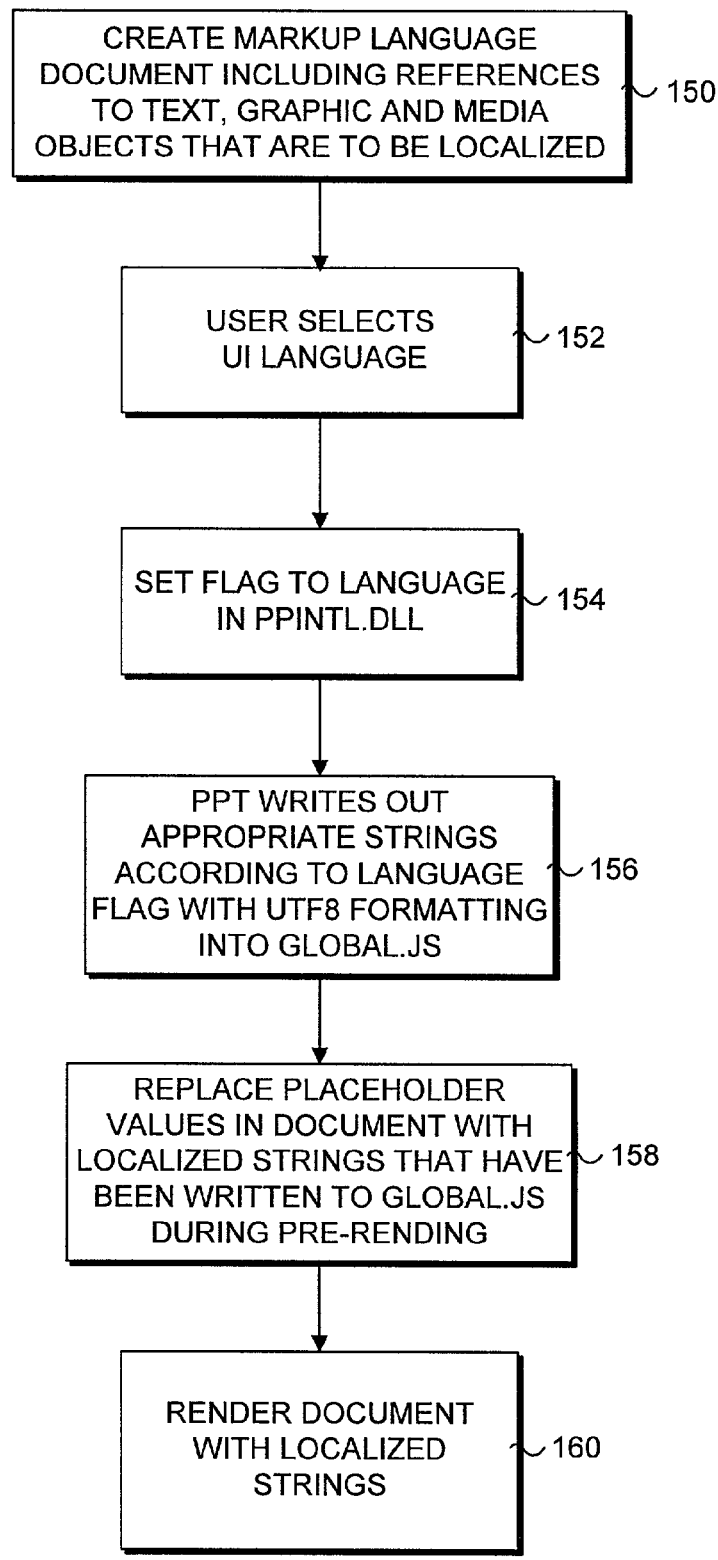
FIG. 4 is a flow chart illustrating the logic used by the present invention to localize objects in markup language documents.

Although FIGS. 2 and 3 convey content in different languages, the same HTML code document is used for rendering both pages. In order to produce the pages rendered in different languages, a process for localizing objects is implemented, as follows. With reference to FIG. 4, the process starts in a block 150, in which an HTML document is created so as to include a plurality of placeholder values corresponding to text, graphic, and/or media objects that are to be rendered in a specified language when the HTML document is displayed by a browser, to produce the UI page (i.e., the lobby page). Next, a user selects the specified language from a list of languages supported by the application program's UI, as indicated in a block 152. For instance, the lobby pages of FIGS. 2 and 3 are rendered in response to the user selecting English and German for the UI language, respectively. The logic then flows to a block 154, wherein a flag in a dynamic link library called PPINTL.dll (i.e., the POWERPOINT™ International dll file) is set, indicating the selected language. In response to receiving the flag, POWERPOINT 2000™ extracts an appropriate set of localized strings in the specified language from PPINTL.dll, and writes these strings into a reference file called global.js using UTF8 formatting, as indicated by a block 156. As described in further detail below, the global.js reference file comprises a plurality of name-value pairs that link objects referenced in the HTML document to localized objects. During a pre-rendering operation of the HTML document (e.g., when the HTML document is initially loaded by a browser), the placeholder values in the HTML document are replaced with localized objects based on the name-value pairs in the global.js reference file, as provided by a block 158. As a result, when the document is rendered in a block 160, objects localized to the specified language are rendered, thereby conveying content in the specified language.

As discussed above, the HTML document page is coded to include placeholder variables that comprise references to text, graphic, and/or media objects that are to be rendered to convey content in a selected language. The HTML code corresponding to lobby pages 100 and 100' is shown below in a LISTING 1. In this exemplary implementation, only text objects are replaced with localized strings stored in the PPINTL.dll and written to the global.js reference file. It will be understood by those skilled in the art that graphic and media objects can also be localized in a similar manner, and that the concept of localizing strings, as described below, is thus equally applicable to localizing graphic and media objects.

LISTING 1. Lobby.htm

```
1.   <html>
2.   <head>
3.   <meta NAME="VERSION" CONTENT="9.0.0.2518">
4.   <title></title>
5.
6.   <script LANGUAGE="JavaScript" src="global.js">
7.   <!--
8.   {
9.      function writeBcast_CharSetInfo() {
10.     document.write ("<meta http-equiv=Content-Type content='text/html; 11. charset= '+ BCAST_CHARSET +'\'>");
12.     }
13.     writeBcast_CharSetInfo();
14.   }
15.   //-->
16.   </script>
17.
18.   <style type="text/css">
19.   <!--
20.   @import url(style.css);
21.   -->
22.   </style>
23.   ... <some function definitions>
24.   <script LANGUAGE="JavaScript" for="window" event="onload">
25.   <!--
26.   ...
27.   document.title = FEATURE_TITLE + " " + LOBBY_PAGE_LABEL;
28.   document.all.FEATURE_TITLE.innerText = FEATURE_TITLE;
29.   document.all.EVENT_TITLE.innerText = EVENT_TITLE;
30.   document.all.EVENT_PRESENTER.innerText = EVENT_PRESENTER;
31.
32.   document.all.EVENT_CONTACT.innerHTML = '<a href="mailto:'+ EVENT_CONTACT 33. +'?Subject=' + EVENT_TITLE + '">'+ EVENT_CONTACT +'</a>';
34.
35.   document.all.EVENT_DESCRIPTION.innerHTML = EVENT_DESCRIPTION;
36.   document.all.EVENT_TITLE_LABEL.innerText = EVENT_TITLE_LABEL;
37.   PAGE_COLOR = "#000094";
38.
39.   document.all.EVENT_PRESENTER_LABEL.innerText = EVENT_PRESENTER_LABEL;
40.   document.all.EVENT_CONTACT_LABEL.innerHTML = EVENT_CONTACT_LABEL;
41.   document.all.EVENT_DESCRIPTION_LABEL.innerText = EVENT_DESCRIPTION_LABEL;
42.   document.all.ReplayButton.innerText = REPLAY_BUTTON_LABEL;
```

| LISTING 1. Lobby.htm |
|---|
| 43. document.all.ReplayButton.Title = REPLAY_BUTTON_TITLE;
44. document.all.nsplayer.Style.visibility = "hidden";
45.
46. if ((SHOW_TIME != "") && (SHOW_END_TIME !="")) {
47. document.all.DATE_TIME_LABEL.innerText = DATE_TIME_LABEL;
48. document.all.DATE_TIME.innerText = (SHOW_TIME_LOCAL + "31 " +
49. SHOW_END_TIME_LOCAL);
50. }
51. else {
52. document.all.DATE_TIME_LABEL.style.visibility = "hidden";
53. document.all.DATE_TIME.style.visibility= "hidden";
54.
55. }
56. -->
57. </script>
58. .
59. .
60. .
61.
62. </head>
63.
64. <body background="nsnbg.gif" id="lobby">
65. <button language="JavaScript" name="ReplayButton" id="ReplayButton"
66. STYLE="cursor: hand;color: black;padding: 2;font-
67. size:8pt;position:absolute; left: 750; top:100; height:25"
68. onclick="location.href = 'event.htm#archive';">
69. </button>
70.
71. <div id="LITTLE_BLUE_LINE" STYLE="position:absolute; left: 660;
72. top:113;"><img src="blueline.gif" alt="blueline.gif" height="1"
73. width="90"></div>
74.
75. <div align="left" id="logo" STYLE="position: absolute; font-weight: bold; 76. top:10;"><img src="logo.GIF" alt="Logo.GIF" WIDTH="161" HEIGHT="34">
77.
78. <div align="center" id="FEATURE_TITLE" STYLE="labeleffect"></div>
79. </div>
80.
81. <div id="BLUE_LINE" STYLE="position:absolute; left: 180; top:60;"><img 82. src="blueline.gif" alt="blueline.gif" height="2" width="824"></div>
83.
84. <div id="STATUS_TICKER" STYLE="position:absolute; left: 110; top:100;
85. width: 525; HEIGHT: 25";
86. <iframe id="STATUS_PAGE" WIDTH="550" HEIGHT="25" ALIGN="CENTER"
87. FRAMEBORDER="1" MARGINHEIGHT="0" MARGINWIDTH="5" NAME="STATUS_PAGE"
88. SCROLLING="AUTO" SRC="1_status.htm"></iframe>
89. </div>
90.
91. <TABLE WIDTH=75% ALIGN=top STYLE="font-weight:normal;font-size:
92. 10pt;position:absolute; left: 10; top:150" BORDER=0 CELLSPACING=3
93. CELLPADDING=4>
94. <TR>
95. <TD WIDTH=85 NOWRAP VALIGN=top ><div id="EVENT_TITLE_LABEL"
96. class="labeleffect" ></div>
97. </TD>
98. <TD VALIGN=top><div id="EVENT_TITLE" class="labeleffect" ></div>
99. </TD>
100. </TR>
101. <TR> |

| LISTING 1. Lobby.htm |
|---|
| 102. <TD WIDTH=85 NOWRAP VALIGN=top><div id="EVENT_PRESENTER_LABEL" 103. class="labeleffect"></div>
104. </TD>
105. <TD VALIGN=top><div id="EVENT_PRESENTER"></div>
106. </TD>
107. </TR>
108. <TR>
109. <TD WIDTH=85 NOWPAP VALIGN=top><div id="DATE_TIME_LABEL"
110. class="labeleffect"></div>
111. </TD>
112. <TD VALIGN=top><div id="DATE_TIME"></div>
113. </TD>
114. </TR>
115. <TR>
116. <TD WIDTH=85 NOWRAP VALIGN=top><div id="EVENT_CONTACT_LABEL"
117. class="labeleffect"></div>
118. </TD>
119. <TD VALIGN=top><div id="EVENT_CONTACT" STYLE="z-index:10"></div>
120. </TD>
121. </TR>
122. <TR>
123. <TD WIDTH=85 NOWRAP VALIGN=top><div id="EVENT_DESCRIPTION_LABEL" 124. class="labeleffect"></div>
125. </TD>
126. <TD VALIGN=top><div id="EVENT_DESCRIPTION"></div>
127. </TD>
128. </TR>
129. </TABLE>
130.
131. </body>
132. </html> |

Each of the items in bold font included in LISTING 1 comprises a placeholder value that references an object that is to be localized. Localization of the objects is facilitated by the name-value pairs in the global.js reference file. The first item in each name-value pair corresponds to a placeholder value, and the second item corresponds to either a localized string that is extracted from PPINTL.dll or an internal value provided by POWERPOINT 2000™. The second item is substituted in place of the placeholder value during the pre-rendering operation. In the following listing of global.js corresponding to the rendered English language lobby page (LISTING 2) and the German language lobby page (LISTING 3) of FIGS. 2 and 3, respectively, relevant name-value pairs are shown in bold font. The name value pairs that are in both bold and italic font correspond to entries that link a placeholder value to data internally provided by POWERPOINT 2000. These data will depend on corresponding entries made by a user in POWERPOINT 2000 when scheduling a presentation broadcast. The bolded non-italicized entries correspond to name-value pairs that link placeholder values to localized strings extracted from PPINTL.dll based on the specified language.

| LISTING 2. Global.js (English) |
|---|
| 1. GLOBAL_VERSION = "9.0";
2. BCAST_CHARSET = "UTF-8";
3. NS_PLAY = |

LISTING 2. Global.js (English)

4. http://www.microsoft.com/Windows/Downloads/Contents/Products
5. /MediaPlayer/";
6. NS_CORE =
7. "http://activex.microsoft.com/activex/controls/mplayer/en
8. /nsmp2o99.cab#Version=6,0,2,902";
9. NS_FILE =
10. "http://activex.microsoft.com/activex/controls/mplayer/en
11. /nsftsinf.cab#Version=3,0,0,2700";
12. VS_FTS_IP = "";
13. VS_FTS_PORT = "";
14. LOW_FTS_IP = "";
15. LOW_FTS_PORT = "";
16. BASE_URL = "\\\\cup-ras-
17. 01\\broadcast\\eunicey\\broadcast19990112105119\
18. \Eunice's 01-12-99 presentation";
19. SHOW_TIME = 01/12/1999 21:30:00 UTC-000";
20. = "01/12/1999 22:30:00 UTC-000";
21. SHOW_TIME_LOCAL = new Date (SHOW_TIME);
22. SHOW_END_TIME_LOCAL = new Date (SHOW_END_TIME);
23. UPDATE_MESG = "This presentation broadcast has ended";
24. EVENT_TITLE = "Eunice's 01-12-99 presentation";
25. EVENT_PRESENTER = "Eunice Yan";
26. EVENT_CONTACT = "eunicey";
27. EVENT_CONTACT_URL = "<A HREF=mailto:" + EVENT_CONTACT + ">" +
28. EVENT_CONTACT + "</A>";
29. EVENT_DESCRIPTION = "Test Department Meeting on <BR>PowerPoint
30. 2000<BR>Jan 12, 1999";
31. PRESENTATION_NAME = "Eunice's 01-12-99 presentation";
32. HTML_FILENAME = "Eunice's 01-12-99 presentation_slide00009.htm";
33. ENABLE_AUDIO = "";
34. EMAIL = "pareshp";
35. CHAT_URL = "";
36. CHAT_FILE = "";
37. CHAT_FILE_EXISTS = "FALSE";
38. HELP_URL = "nshelp.htm";
39. TEST_URL = "nstest.htm";
40. ARCHIVE_URL = "Eunice's 01-12-99
41. presentation_broadcast19990112105119.asf";
42. VIDEO_FLAG = "1";
43. VIDEO_WIDTH = "176";
44. VIDEO_HEIGHT = "144";
45. ASX = "";
46. TEST_ASX = "";
47. MULTICAST = "1";
48. BROWSER_TEXT = "This presentation contains content . . .";
49. AUDIO_HELP = "This page allows you to make sure the microphone . . .;
50. VIDEO_HELP = "This page allows you to make sure the camera . . .;
51. CLIENT_HELP_TEXT = "If you are experiencing problems viewing . . .;
52. FEATURE_TITLE = "Presentation Broadcast";
53. EVENT_TITLE_LABEL = "Title:";
54. DATE_TIME_LABEL = "Date & Time:";
55. EVENT_PRESENTER_LABEL = "Presenter:";
56. EVENT_CONTACT_LABEL = "Contact:";
57. EVENT_DESCRIPTION_LABEL = "Description:";
58. AUDIO_TEST_PAGE_LABEL = "Audio Test Page";
59. <more name value pairs(not relevant to example page)>
60. .
61. .
62. .
63. REPLAY_BUTTON_LABEL = "Replay Broadcast";
63. REPLAY_BUTTON_TITLE = "This will allow you to Replay the PowerPoint

LISTING 2. Global.js (English)

64. Presentation Broadcast.";
65. timetoshow_mesg = "This Presentation Broadcast will begin shortly.
66. Please wait . . .";

LISTING 3. Global.js (German)

1. GLOBAL_VERSION = "9.0";
2. BCAST_CHARSET = "UTF-8";
3. NS_PLAY
6. http://www.microsoft.com/Windows/Downloads/Contents/Products
7. /MediaPlayer/";
6. NS_CORE =
7. "http://activex.microsoft.com/activex/controls/mplayer/en
8. /nsmp2o99.cab#Version=6,0,2,902";
9. NS_FILE =
10. "http://activex.microsoft.com/activex/controls/mplayer/en
11. /nsftsinf.cab#Version=3,0,0,2700";
12. VS_FTS_IP = "";
13. VS_FTS_PORT = "";
14. LOW_FTS_IP = "";
15. LOW_FTS_PORT = "";
16. BASE_URL = "\\\\cup-ras-
17. 01\\broadcast\\eunicey\\broadcast19990112105119\
18. \Eunice's 01-12-99 presentation";
19. SHOW_TIME = 01/12/1999 21:30:00 UTC-000";
20. SHOW_END_TIME = "01/12/1999 22:30:00 UTC-000";
21. SHOW_TIME_LOCAL = new Date (SHOW_TIME);
22. SHOW_END_TIME_LOCAL = new Date (SHOW_END_TIME);
23. UPDATE_MESG = "Diese Vorstellung Sendung hat beendet";
24. EVENT_TITLE = "Eunice's 01-12-99 presentation";
25. EVENT_PRESENTER = "Eunice Yan";
26. EVENT_CONTACT = "eunicey";
27. EVENT_CONTACT_URL = "<A HREF=mailto:" + EVENT_CONTACT + ">" +
28. EVENT_CONTACT + "</A>";
29. EVENT_DESCRIPTION = "Prüfen Sie Abteilung, die<BR>
30. auf Begegnet PowerPoint <BR >Jan 12, 1999";
31. PRESENTATION_NAME = "Eunice's 01-12-99 presentation";
32. HTML_FILENAME = "Eunice's 01-12-99 presentation_slide00009.htm";
33. ENABLE_AUDIO = "";
34. EMAIL = "pareshp";
35. CHAT_URL = "";
36. CHAT_FILE = "";
37. CHAT_FILE_EXISTS = "FALSE";
38. HELP_URL = "nshelp.htm";
39. TEST_URL = "nstest.htm";
40. ARCHIVE_URL = "Eunice's 01-12-99
41. presentation_broadcast19990112105119.asf";
42. VIDEO_FLAG = "1";
43. VIDEO_WIDTH = "176";
44. VIDEO_HEIGHT = "144";
45. ASX = "";
46. TEST_ASX = "";
47. MULTICAST = "1";
48. BROWSER_TEXT = "Diese Vorstellung enthält Inhalt . . .";
49. AUDIO_HELP = "Diese Seite erlaubt Sie zu sich das Mikrophon . . .;
50. VIDEO_HELP = "Diese Seite erlaubt Sie zu sich die Kamera . . .;
51. CLIENT_HELP_TEXT = "Wenn Sie Probleme erfahren, ansehen, . . .;
52. FEATURE_TITLE = "Vorstellung Sendung";

LISTING 3. Global.js (German)

```
53.  EVENT_TITLE_LABEL = "Titel:";
54.  DATE_TIME_LABEL = "Datum & Zeit:";
55.  EVENT_PRESENTER_LABEL = "Anwesender:";
56.  EVENT_CONTACT_LABEL = "Kontakt:";
57.  EVENT_DESCRIPTION_LABEL = "Beschreibung";
58.  AUDIO_TEST_PAGE_LABEL = "Tonprüfung Seite"";
59.  <more name value pairs(not relevant to example page)>
60.  .
61.  .
62.  .
63.  REPLAY_BUTTON_LABEL = "Replay Sendung"
63.  REPLAY_BUTTON_TITLE = "Dies wird Sie Replay das erlauben PowerPoint
64.  Vorstellung Sendung.";
65.  timetoshow_mesg = " Diese Vorstellung Sendung wird bald beginnen
66.  Bitte Wartezeit . . .";
```

All of the objects in the lower portion of lobby pages 100 and 100' comprise localized objects that are substituted in place of placeholder values in lobby.htm based on corresponding entries in the English and German global.js files. For example, "Title:" label 114 is rendered in English so as to display the text "Title:" in the following manner. When the user specifies English as the UI language, a language flag 162 identifying English as the specified language is passed to PPINTL.dll 164. Upon receiving this flag, PPINTL.dll writes a plurality of localized strings to global.js, including a "Title:" string in a line 53 corresponding to an EVENT_TITLE_LABEL reference. When lobby.htm is loaded into the browser, a pre-rendering process is performed, wherein JavaScript functions listed in lines 24-57 are executed. Note that line 6 includes HTML code that identifies global.js as a source document. As the JavaScript functions are executed, placeholder values in lobby.htm are replaced with localized strings based on corresponding name-value pairs in global.js. For instance, line 36 contains the following statement:

36.  document.all.EVENT_TITLE_LABEL.innerText= EVENT_TITLE_LABEL;

This function instructs the browser to replace the place holder value "id="EVENT_TITLE _LABEL" in line 95 with the localized string "Title:" based on the name-value pair in line 53 of global.js. In a similar manner, placeholder values corresponding to each of labels 118, 122, 126, and 130 are replaced with localized strings based on respective name-value strings referenced in global.js.

As discussed above, some of the objects in lobby pages 100 and 100' comprise content in accord with data 166 that is internally provided by POWERPOINT 2000. These objects include title 112 of the presentation, presenter 116, date and time 120, contact e-mail address 124, and a presentation description 128. Data corresponding to each of these objects are entered by the user when scheduling a presentation broadcast, further details of which are provided in the co-pending commonly assigned U.S. patent application, Ser. No. 09/333,754, as referenced above. All of these data except for data and time 120 are substituted in place of corresponding placeholder values in lobby.htm in a manner similar to the substitution of localized strings. However, the second item in each of the name-value pairs corresponding to these objects comprises a variable string that is provided directly from POWERPOINT 2000 rather than a predefined localized string extracted from PPINTL.dll.

Unlike the other objects, data corresponding to date and time 120 are generated using two name-value pairs in global.js rather a single name-value pair. More specifically, date and time 120 includes data corresponding to the SHOW_TIME_LOCAL and SHOW_END_TIME local name-value pairs listed in lines 21-22 of global.js through use of instructions listed in lines 48-49 of lobby.htm.

With reference to FIG. 3, localized objects are written to German lobby page 100' in a manner similar to that discussed above for localizing objects rendered in English lobby page 100, except that in this instance the global.js file is populated with localized strings corresponding to the German language. As a result, labels 114', 118', 122', 126', and 130' now comprise German text instead of English text, e.g., "Titel:" label 114' has replaced "Title:" label 114, and "Anwesender:" label 118' has replaced "Presenter:" label 118.

FIG. 5 shows localizing broadcast status box 108 and replay broadcast button 110. In the case of broadcast status box 108, this object is localized through use of an "iframe" object that is displayed on a separate frame disposed on top of English lobby page 100. The instructions for producing this effect are provided in lines 84-89 of lobby.htm, which specifies another HTML document called 1_status.htm as the source for the iframe object, a partial listing of which is shown below in LISTING 4.

LISTING 4. 1_status.htm

```
1.   <html>
2.   <head>
3.   <title></title>
4.   <meta NAME="VERSION" CONTENT="9.0.0.2518">
5.
6.   <script LANGUAGE="JavaScript" src="global.js">
7.   <!--
8.   {
9.     function writeBcast_CharSetInfo() {
10.       document.write ("<meta http-equiv=Content-Type content='text/html; 11. charset= '+ BCAST_CHARSET +'\'>");
12.    }
13.    writeBcast_CharSetInfo();
14.    }
15.   //-->
16.   </script>
17.   <script for="window" event="onunload">
18.
19.   parent.statuspageloaded=false;
20.
21.   </script>
22.
23.   <script LANGUAGE="JavaScript" event="onload"> {
24.
25.   SHOWHASENDED="0";
26.
27.   }
28.   </script>
29.   <script LANGUAGE="JavaScript"> {
30.   if (window.parent.document.all.ReplayButton) {
31.   window.parent.document.all.ReplayButton.style.visibility="hidden";
32.   window.parent.document.all.LITTLE_BLUE_LINE.style.visibility =
33.   "hidden";
34.      }
35.
36.   if (MULTICAST != "1") {
37.      document.write ("<meta HTTP-EQUIV='REFRESH' CONTENT='2'>")
38.      }
```

LISTING 4. 1_status.htm -continued

```
39.     else {
40.        document.write ("<meta HTTP-EQUIV='REFRESH'
CONTENT='120'>");
41.     }
42.  }
43.  </script>
44.
45.  </head>
46.
47.  <body BGCOLOR="#FFFFFF" TEXT="#000000"
LINK="#000066" VLINK="#666666" 48. TOPMARGIN="0"
LEFTMARGIN="0">
49.   <div id="Clock" align="left"
style="padding:2;padding-left:5;font
50.   family: Tahoma,Verdana,Arial,Helvetica; font-
size: 10pt; font-
51.   weight:bold; color:#000000">
52.   <script LANGUAGE="JavaScript">
53.   {
54.
55.   PAGE_COLOR = "#000094";
56.
57.   function noTime() {
58.   if (SHOW_TIME =="") {
59.      Clock.innerHTML = FEATURE_TITLE + " " +
LOBBY_PAGE_LABEL;;
60.   if (UPDATE_MESG != "") {
61.
window.parent.document.all.STATUS_TICKER.style.visibility
= "visible";
62.      Clock.innerHTML = UPDATE_MESG;
63.      Clock.style.color = PAGE_COLOR;
64.   }
65.
66.   if (ARCHIVE_URL !="") {
67.
window.parent.document.all.ReplayButton.style.visibility
= "visible";
68.
window.parent.document.all.LITTLE_BLUE_LINE.style.visibil
ity =
69.   "visible";
70.   }
71.      else if
((window.parent.document.all.ReplayButton) &&
72.
(window.parent.document.all.ReplayButton.style.visibility
!= "hidden"))
73.      {
74.
window.parent.document.all.ReplayButton.style.visibility
= 75. "hidden";
76.
window.parent.document.all.LITTLE_BLUE_LINE.style.visibil
ity 77. = "hidden";
78.      }
79.    }
80.  }
81.  <other function definitions>
82.  .
83.  .
84.  .
85.  </script>
86.
87.  </div>
88.
89.  </body>
90.  </html>
```

As with the lobby.htm, 1_status.htm includes JavaScript™ code to link placeholder values in 1_status.htm with localized values through the use of global.js. In particular, lines 60-61 of I_status.htm reference an UPDATE_MESG placeholder value that is replaced with a corresponding UPDATE_MESG value of "This presentation broadcast has ended," as defined in a line 23 of global.js (English). In a similar manner with respect to German lobby page 100' (see FIG. 6), the UPDATE_MESG placeholder value in 1_status.htm is replaced with "Diese Vorstellung Sendung hat beendet," as defined in a line 23 of global.js (German).

The text label on replay broadcast button 110 is also rendered in the specified language. In this case, the text is part of a button object rather than a plain text object. Accordingly, an id="ReplayButton" placeholder value defined in a line 65 of lobby.htm, which refers to the button object and not the string, is replaced with "Replay Broadcast," as provided by a line 63 in global.js (English). With respect to German lobby page 100', the replay broadcast button 110' label text is defined to be "Replay Sendung."

Another aspect of the present invention concerns the ability to localize graphic objects that include a global language-independent portion, e.g., a trademark logo, and a localized portion (i.e., a portion of an overall graphic that is rendered to include text in accord with the selected language). In a preferred embodiment, this capability is enabled, in part, through the use of Cascaded Style Sheets (CSS), which permit a web page designer to include various style rules within HTML documents that are interpreted by an appropriate browser when the documents are rendered for display in the browser. The rendered documents then include specific stylistic attributes in accord with the style rules. For example, a user can include a style rule to specify a background color or image for a rendered page. In order to take advantage of CSS styles, it is necessary that the browser used to render HTML documents containing CSS style rules be capable of applying the CSS style rules. In the event a user does not employ such a browser, the CSS rules are simply ignored, and the rendered page is displayed without the stylistic attributes defined by the CSS rules.

There are presently two versions of CSS. The first version, CSS1, provides for control of typefaces, font color, background color, graphics, margins, spacing, type style, and other visual stylistic attributes. The second version, CSS2, includes support for different types of media, such as aural object, and provides for further control of visual stylistic attributes including page breaks, windows, and orphans. A more complete definition of the style rules corresponding to these versions can be found on the World-Wide-Web consortium web site at http://www.w3.org/pub/www/tr/rec-css1, and http://www.w3.org/pub/www/tr/rec-css2. CSS1 is supported by the Netscape Corporation's NAVIGATOR™ 4.0 and later browsers, and Microsoft Corporation's INTERNET EXPLORER™ 4.0 and later browsers. CSS2 is supported by INTERNET EXPLORER™ 5.0 and later browsers.

CSS style rules combine HTML tags with properties to format each HTML tag in a desired manner. In the case of style sheets, an HTML tag is used as a selector, and the property and value of the selector are combined into a declaration. Style rules can define the layout of a tag, as well as other typographic and design properties.

A CSS style rule consists of two parts: the selector, which can be an HTML tag such as H1 or P, and the declaration, which defines the property and value of the selector. For example, a style rule may included the following declaration:

color: magenta wherein color is the property, and magenta is the value.

The style rules are attached to a standard HTML document using one of three methods: (1) external style sheets; (2) embedded style sheets; and, (3) inline styles. The term "cascading" refers to the capability for style information from more than one source to be combined within a single document. In general, style sheets are usually defined externally or embedded within HTML documents. An advantage of external style sheets is that a single style sheet can be used to define stylistic attributes for a plurality of HTML documents comprising an entire web site or portions thereof. Inline styles are usually employed to override particular style definitions contained in an embedded or external style sheet, although inline styles can be used to defined the style of an entire document.

The following exemplary HTML code corresponds to an embedded style sheet definition. Embedded style sheet definitions start with a <STYLE> tag and end with a </STYLE> tag, and the particular style rules for the style sheet are defined between these tags.

```
<STYLE TYPE = "text/css">
<!--
    H1 {color: blue}
    P {font family: Arial, Helvetica, sans-serif;
    color: black}
-->
</STYLE>
```

The STYLE TYPE="text/css" definition specifies that the style corresponds to the cascading style sheet specification. A developer may also employ JavaScript style sheets in addition to or in place of cascading style sheets by specifying STYLE TYPE="text/jss."

External style sheets are defined in documents separate from the HTML documents with which they are associated. An HTML document may reference an external style sheet through importation or linking. A style sheets is imported by referencing a Uniform Resource Location (URL) where the style sheet is stored within a comment disposed between the style start and end tags, as follows:

```
<STYLE>
<!--
    @import url <url address>
-->
-->
</STYLE>
```

Style sheets may be linked to a document through the following declaration:

<link rel="stylesheet" HREF "<CSS file location>"

With reference to FIG. 5, composite graphic 102 is rendered using cascading style sheet rules so that it appears to a viewer as a single localized graphic. However, in reality, composite graphic 102 comprises a global portion (i.e., trademark logo 104) that is rendered the same, regardless of the language selected for localization, and a localized portion (i.e., banner 106) that is rendered in the specified language.

Lines 75-76 of lobby.htm include instructions for displaying trademark logo 104 adjacent to the upper-left corner of English lobby page 100. In particular, line 76 includes an instruction identifying the image source as a "Logo.GIF" file, in which a graphic image corresponding to trademark logo 104 is stored. A portion of the instructions for producing banner 106 are defined in a line 78 of lobby.htm, which is reproduced below.

```
78.  <div align="center" id="FEATURE_TITLE"
     STYLE="labeleffect"></div>
```

In a manner similar to that discussed above with reference to text labels, id="FEATURE_TITLE" is a placeholder value that is replaced by "Presentation Broadcast" in accord with a corresponding entry in a line 52 of global.js (English). However, in this instance, the localized text, "Presentation Broadcast," is displayed in accord with stylistic rules defined in a "labeleffect" style definition that is included in an external CSS file called STYLE.CSS, as shown below in a LISTING 5. This CSS file is imported into lobby.htm in response to instructions contained in lines 18-22 of lobby.htm.

LISTING 5. STYLE.CSS

```
1.   BODY
2.   {
3.      FONT-FAMILY: Tahoma, Verdana, Arial, Helvetica;
4.      FONT-SIZE: 10pt
5.   }
6.   .feedbackbutton
7.   {
8.      BORDER-LEFT: white thin solid;
9.      BORDER-RIGHT: white thin solid;
10.     COLOR: #ffffff;
11.     CURSOR: hand;
12.     DISPLAY: block;
13.     FONT-SIZE: 8pt;
14.     FONT-WEIGHT: bold;
15.     PADDING-BOTTOM: 2px;
16.     PADDING-LEFT: 10px;
17.     PADDING-RIGHT: 10px;
18.     PADDING-TOP: 2px
19.  }
20.  .labeleffect
21.  {
22.     FONT-WEIGHT: normal;
23.     FONT-SIZE: 11px;
24.     LETTER-SPACING: 2px;
25.     BACKGROUND-COLOR: white;
26.     TEXT-ALIGN: center;
27.     BORDER-STYLE: solid;
28.     BORDER-WIDTH: 1px;
29.  }
```

The "labeleffect" CSS style rules instruct the browser to display the text in an 11 pixel-size font, using normal weight and 2 pixel spacing, with a white background color, aligned in the center of a box that is one pixel in width. Identical stylistic attributes are applied during rendering of a banner 106' corresponding to German Lobby page 100', except that the "Presentation Broadcast" text is now replaced with "Vorstellung Sendung." In this manner, each of composite graphics 102 and 102' appear to the viewer to comprise a single graphic object that conveys content in the English and German languages, respectively.

While the foregoing description has discussed the localization of text objects, it will be apparent from the disclosure how other objects can be localized in a similar manner For example, rather than referencing a text string, one or more name-value pairs in global.js can reference a graphic image. Furthermore, by including aural CSS style sheets, localization of media objects comprising aural messages in a specified language may also be provided.

Although the present invention has been described in connection with the preferred form of practicing it, those of ordinary skill in the art will understand that many modifications can be made thereto within the scope of the claims that follow. Accordingly, it is not intended that the scope of the present invention in any way be limited by the above description, but instead be determined entirely by reference to the claims that follow.

The present invention in which an exclusive right is claimed is defined by the following:

1. A method for localizing objects on a client computer in a markup language document so that when the markup language document is rendered by a browser running on the client computer, the objects are rendered to convey content in a specified language, comprising the steps of:
    (a) including a plurality of placeholder references in the markup language document in JavaScript code referencing text, graphic, and/or media objects that are to include content in the specified language when the markup language document is rendered;
    (b) providing a set of localized objects on the client computer in the specified language, each localized object of the set being associated with a corresponding text, graphic, and/or media object potentially referenced in the markup language document;
    (c) retrieving localized objects corresponding with the placeholder references in the markup language document from the set of localized objects stored on the client computer; and
    (d) inserting the localized objects corresponding with the placeholder references into the markup language documents, such that when the markup language document is rendered, the text, graphic, and/or media objects referenced in the markup language document are rendered to convey content in the specified language.

2. The method of claim 1, further comprising the step of enabling a user to select the specified language from a list of languages.

3. The method of claim 1, wherein a plurality of sets of localized objects in different languages are provided, and wherein the step of retrieving localized objects corresponding with the placeholder references in the markup language document comprises the step of extracting an appropriate set of localized objects from an appropriate set of localized objects corresponding to the specified language.

4. The method of claim 3, wherein the file comprises a dynamic link library, further comprising the steps of:
    (a) passing indicia corresponding to the specified language to the dynamic link library; and
    (b) automatically extracting the appropriate set of localized objects corresponding to the specified language from the dynamic link library as a function of the indicia.

5. The method of claim 1, wherein the localized objects corresponding to the text objects referenced in the markup language document comprise strings containing characters in the specified language.

6. The method of claim 1, further including the step of creating reference data comprising a plurality of name-value pairs, each name-value pair comprising an object referenced in the markup language document and a corresponding localized object in the specified language.

7. The method of claim 6, further comprising the step of parsing the reference data to retrieve the localized objects that are inserted into the markup language document, based on references included in the markup language document and the reference data.

8. The method of claim 1, wherein at least one object in a rendered page corresponding to the markup language document comprises a composite graphic, the composite graphic including a plurality of elements including at least one of a graphics element and a text element located adjacent to each other such that the plurality of elements is associable as a single element, the composite graphic further including a global language-independent portion and a localized portion, further comprising the step of including a cascading style sheet declaration in the markup language document defining stylistic attributes to be applied to the localized portion when the markup language document is rendered by a browser that supports cascading style sheets, to produce the rendered page.

9. A computer-readable medium having computer-executable instructions for facilitating the steps recited in claim 1.

10. A method for providing a user interface on a client computer that supports a plurality of different languages through a single set of markup language documents, said single set including one or more markup language documents, but not a different one or more markup language documents for each of the plurality of different languages, comprising the steps of:
    (a) in each markup language document of the set, including a plurality of descriptive references in JavaScript code corresponding to respective text, graphic, and/or media objects that are to be rendered to convey content in accord with a specified language;
    (b) providing a plurality of sets of localized objects on a client computer corresponding to each of the plurality of different languages, each set of localized objects comprising language-dependent objects potentially corresponding to the text, graphic, and/or media objects referenced in the set of markup language documents;
    (c) enabling a user to select a specified language from among the plurality of different languages;
    (d) retrieving localized objects corresponding with the placeholder references in the markup language document from the set of localized objects stored on the client computer corresponding with the specified language; and
    (e) automatically inserting the corresponding localized objects into each to replace the placeholder references in the markup language document such that when each markup language document is rendered, the text, graphic, and/or media objects referenced in the markup language document are rendered on the client computer to convey content in the user interface language selected by the user.

11. The method of claim 10, wherein the plurality of sets of localized objects comprises a dynamic link library, further comprising the steps of:
    (a) passing indicia corresponding to the language selected by the user to the dynamic link library; and
    (b) automatically extracting an appropriate set of localized objects corresponding to the specified language selected by the user from the dynamic link library.

12. The method of claim 10, wherein the localized objects corresponding to the text objects referenced in the markup language documents comprise strings of characters corresponding to the specified language.

13. The method of claim 10, further including the step of creating reference data comprising a plurality of name value pairs, each name value pair comprising an object referenced in the set of markup language documents and a corresponding localized object.

14. The method of claim 13, further comprising the step of parsing said reference data to retrieve the localized objects that are inserted into the markup language documents based on placeholder references in the markup language documents and the reference data.

15. The method of claim 9, wherein at least one object in a rendered page corresponding to one of the markup language documents comprises a composite graphic, the composite graphic including a plurality of elements including at least one of a graphics element and a text element located adjacent to each other such that the plurality of elements is associable as a single element, the composite graphic further including a global language-independent portion and a localized portion, further comprising the step of including a cascading style sheet declaration in the markup language document defining stylistic attributes to be applied to the localized portion when said one markup language document is rendered by a browser that supports cascading style sheets to produce the rendered page.

16. A computer-readable medium having computer-executable instructions for facilitating the steps recited in claim 10.

17. A client system for implementing a user interface in an application program comprising at least one markup language document that includes a plurality of descriptive references in JavaScript code corresponding to text, graphic, and/or media objects that are to include content in a specified language when the markup language document is rendered on the client system, said specified language comprising one of a plurality of different languages, comprising:
  (a) a memory adapted to store data and machine instructions;
  (b) a processor coupled to the memory, said processor controlling storage of data in the memory and executing the machine instructions to implement a plurality of functions;
  (c) a persistent storage device, coupled to the processor and the memory, on which is stored a set of localized objects in the specified language, the localized objects being associated with text, graphic, and/or media objects referenced in said at least one markup language document; and
  (d) a display on which graphics and text employed in the user interface are rendered in accord with the machine instructions, said display being controlled by the processor, said plurality of functions implemented by the processor including:
    (i) including a plurality of placeholder references in the markup language document in JavaScript code referencing text, graphic, and/or media objects that are to include content in the specified language when the markup language document is rendered;
    (ii) providing a set of localized objects in the specified language one of in the memory and on the persistent storage device, each localized object of the set being associated with a corresponding text, graphic, and/or media object potentially referenced in the markup language document; and
    (iii) retrieving localized objects corresponding with the placeholder references in the markup language document from the set of localized objects; and
    (iv) inserting localized objects into the markup language document corresponding with the placeholder references in the at least one markup language document such that when the at least one markup language document is rendered, the text, graphic, and/or media objects referenced in the at least one markup language document are rendered in the specified language.

18. The client system of claim 17, wherein said at least one markup language document is downloaded to the memory from a computer network.

19. The client system of claim 17, wherein the application program user interface is adapted to support a plurality of different languages and the persistent storage medium further includes a corresponding plurality of separate sets of localized objects, each set of localized objects corresponding to a different one of the plurality of different languages, each set of localized objects comprising language-dependent objects corresponding to text, graphic, and/or media objects referenced in said at least one markup language document.

20. The client system of claim 19, wherein the sets of localized objects are stored in a dynamic link library, and the processor further implements the functions of:
  (a) enabling a user to select the specified language from the plurality of different languages;
  (b) passing indicia corresponding to the language selected by the user to the dynamic link library; and
  (c) automatically extracting an appropriate set of localized objects corresponding to the language selected by the user from the dynamic link library as a function of the indicia and inserting objects from among the set of localized objects that is extracted into said at least one markup language document before said at least one markup language document is rendered so as to present content in a rendered page in accord with the language selected by the user.

21. The client system of claim 17, wherein the localized objects corresponding to the text objects referenced in said at least one markup language document comprise strings containing characters corresponding to the specified language.

22. The client system of claim 17, wherein the functions implemented by the processor further include enabling a user to select the specified language from the plurality of different languages.

* * * * *